United States Patent
Kaufman et al.

(10) Patent No.: US 6,264,806 B1
(45) Date of Patent: Jul. 24, 2001

(54) PLATING FLUID REPLENISHMENT SYSTEM AND METHOD

(75) Inventors: Robert Kaufman, Canoga Park; Norman A. Butler, Northridge, both of CA (US)

(73) Assignee: Technic Inc., Cranston, RI (US)

(*) Notice: Subject to any disclaimer, the term of this patent is extended or adjusted under 35 U.S.C. 154(b) by 0 days.

(21) Appl. No.: 09/413,986

(22) Filed: Oct. 7, 1999

(51) Int. Cl.$^7$ ........................................... G05D 7/00
(52) U.S. Cl. ..................... 204/237; 204/238; 222/426; 222/450
(58) Field of Search ........................ 204/237, 238, 204/480; 222/426, 450

(56) References Cited

U.S. PATENT DOCUMENTS

| | | | |
|---|---|---|---|
| 3,116,853 | * | 1/1964 | Tatibana ........................ 222/426 X |
| 4,631,116 | | 12/1986 | Ludwig . |
| 5,287,060 | | 2/1994 | Reddy et al. . |
| 5,296,123 | | 3/1994 | Reddy et al. . |
| 5,296,124 | | 3/1994 | Eliash et al. . |
| 5,298,129 | | 3/1994 | Eliash . |
| 5,298,130 | | 3/1994 | Ludwig . |
| 5,298,131 | | 3/1994 | Eliash et al. . |
| 5,298,132 | | 3/1994 | Reddy et al. . |
| 5,298,145 | | 3/1994 | Garraway et al. . |
| 5,411,652 | * | 5/1995 | Smith et al. .................... 204/237 X |
| 5,534,126 | * | 7/1996 | Stadler et al. .................. 204/237 X |
| 6,113,769 | * | 9/2000 | Uzoh et al. ..................... 204/237 X |

* cited by examiner

*Primary Examiner*—Gerald A. Michalsky
(74) *Attorney, Agent, or Firm*—Blakely, Sokoloff, Taylor & Zafman

(57) ABSTRACT

A plating chemical replenishment system is described having a tank for supporting a chemical solution used in a plating fluid, a container having a pre-determined volume, a first valve for selectively coupling the chemical solution from the tank to the container to form a pre-determined volume of the chemical solution within the container, and a second valve for selectively dispensing the pre-determined volume of the chemical solution from the container to a plating fluid reservoir. Also disclosed is a method of dispensing a plating solution to a plating fluid reservoir, comprising the steps of forming a pre-determined volume of the plating solution; and dispensing the pre-determined volume of the plating solution to the plating fluid reservoir. In addition, a plating system is provided for plating a surface of an article, comprising a plating fluid tank for supporting a plating fluid reservoir, a plating apparatus for using plating fluid from the plating fluid reservoir to plate the surface of the article; and a plating chemical replenishment system. The replenishment system has a chemical solution tank for supporting a chemical solution used in a plating fluid; a container having a pre-determined volume; a first valve for selectively coupling the chemical solution from the chemical solution tank to the container to form a pre-determined volume of the chemical solution within the container; and a second valve for selectively dispensing the pre-determined volume of the chemical solution from the container to the plating fluid reservoir.

8 Claims, 4 Drawing Sheets

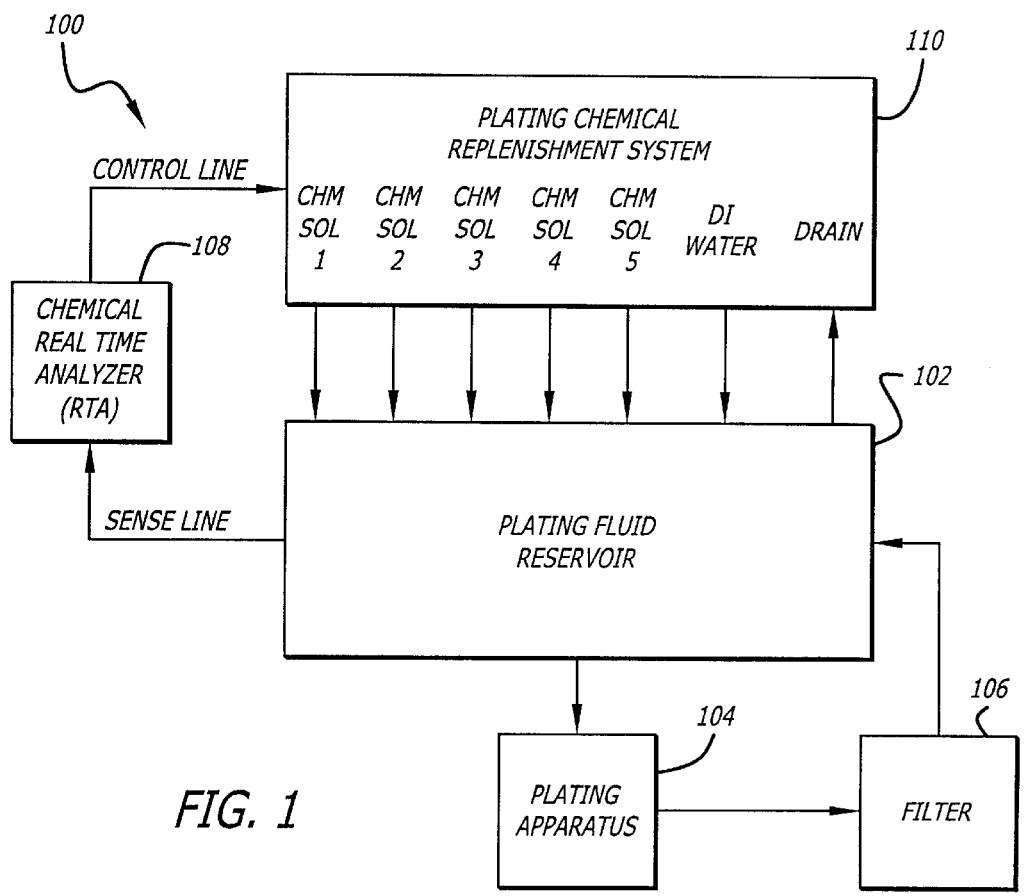
FIG. 1
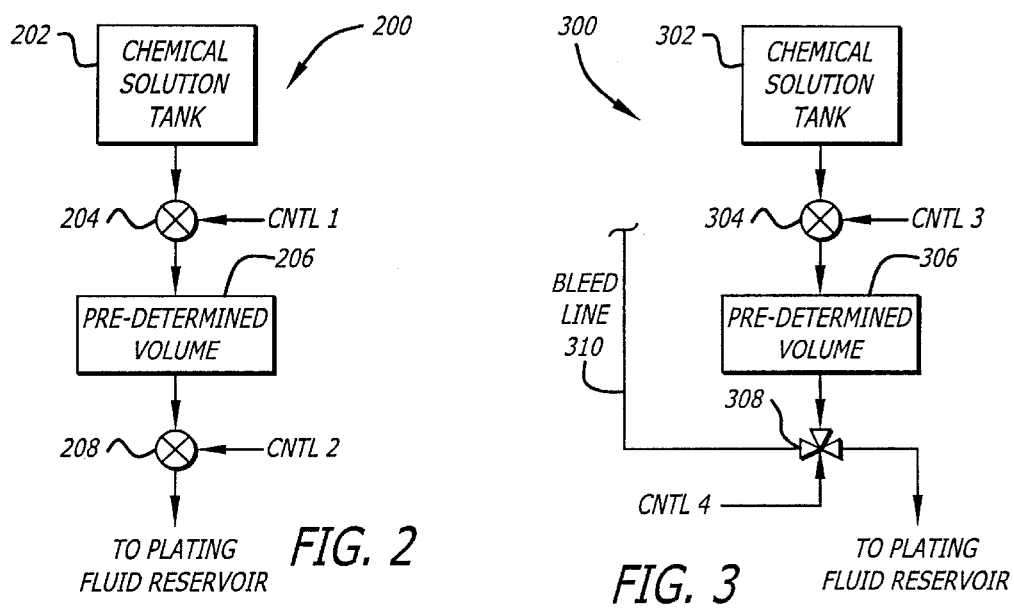
FIG. 2
FIG. 3

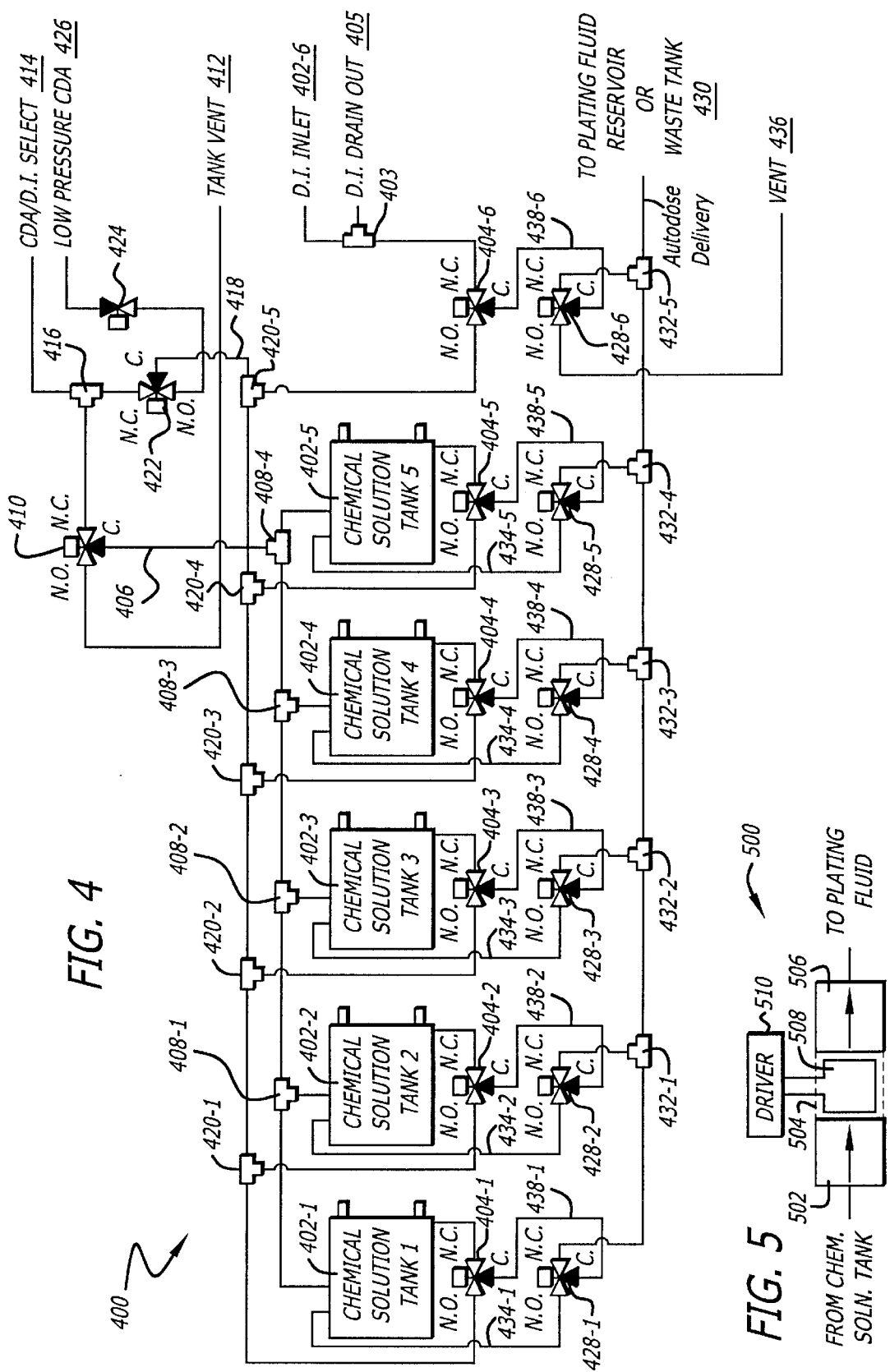

PLATING FLUID REPLENISHMENT SYSTEM AND METHOD

FIELD OF THE INVENTION

This invention relates generally to plating systems, and in particular, to a system, apparatus and method for replenishing a plating fluid reservoir used in plating wafers, substrates, and other articles. Although the disclosure uses the plating of a wafer to exemplify the invention, it shall be understood that the plating of other articles including ceramic substrates is within the scope of the invention.

BACKGROUND OF THE INVENTION

The plating of wafers, substrates and other articles involves many parameters that need to be controlled to achieve a desired plating characteristics. These parameters may include the electrostatic field between the anode and the cathode in contact with the article to improve the uniformity of the plating deposition across the surface of the wafer, the ion concentration gradient between the anode and the cathode contact with the article to improve the plating rate, and the placement of the wafer within a plating bath to improve the plating of via holes on the wafer. There are many other parameters that affect the plating characteristic of a wafer.

One particular plating parameter of interest to the invention is the chemical composition of the plating fluid used in plating wafers, substrates, and other articles. A typical plating fluid comprises a mixture of different chemical solutions including de-ionized (DI) water. In order to obtain a desired plating characteristic across the surface of a wafer, the plating fluid should include the proper concentrations of these chemical solutions. If the proper concentrations of these chemical solutions are not present in the plating fluid, the desired plating characteristic across the surface of a wafer may not be achieved. Therefore, it is desired to properly set and maintain the desired concentrations of the chemical solutions in the plating fluid prior to and during the plating of a wafer.

One impediment to maintaining the desired concentrations of the chemical solutions in a plating fluid during the plating cycle is that these concentrations are continuously changing. One reason for this is that the chemical solutions continuously dissipate, decompose, and/or combine with other chemicals during the plating cycle. Thus, the concentrations of the various chemicals in a plating fluid will change with time if the plating fluid is left alone. Accordingly, plating apparatus provide specialized devices to control the concentrations of the chemicals in the plating fluid during the plating cycle.

One such specialized device is a chemical real time analyzer (RTA). An RTA is a device that probes the plating fluid and periodically determines the concentrations of the chemicals in the plating fluid. Using the information of the current concentrations of the chemicals in the plating fluid, the RTA then determines which and amount of chemical solutions that need to be added to the plating fluid and the amount of plating fluid that needs to be drained prior to adding the chemicals in order to achieve the desired concentrations for the chemicals in the plating fluid. This information is used to control a chemical replenishment system that precisely drains the plating fluid reservoir and precisely adds the proper quantities of chemical solutions to the plating fluid to achieve the desired concentrations for the chemicals in the plating fluid. The measuring and replenishing of the plating fluid occurs periodically during a plating cycle.

The invention provides a plating system, a plating chemical replenishment apparatus and method that precisely adds the right quantities of chemical solutions and precisely drains the plating fluid under the control of an RTA to achieve the desired concentrations for the chemicals in the plating fluid.

SUMMARY OF THE INVENTION

A first aspect of the invention is a plating chemical replenishment system, comprising a tank for supporting a chemical solution used in a plating fluid; a container having a pre-determined volume; a first valve for selectively coupling the chemical solution from the tank to the container to form a pre-determined volume of the chemical solution within the container; and a second valve for selectively dispensing the pre-determined volume of the chemical solution from the container to a plating fluid reservoir. In the preferred embodiment, the plating chemical replenishment system includes a bleed line fluidly coupled to the container to remove gases formed within the container. Also in the preferred embodiment, the plating chemical replenishment system includes a pressurized gas source to force the chemical solution out of the container during the dispensing of the pre-determined volume of chemical solution to the plating fluid reservoir. The replenishment system may also be used to drain plating fluid from the plating fluid reservoir.

A second aspect of the invention is a method of dispensing a plating solution to a plating fluid reservoir, comprising the steps of forming a pre-determined volume of the plating solution, and dispensing the pre-determined volume of the plating solution to the plating fluid reservoir. In the preferred implementation of the dispensing method, a step is provided to remove gas from a container during the step of forming the pre-determined volume of plating solution. In addition, a step is provided to force the pre-determined volume of plating solution from the container using pressurized gas during the dispensing step.

A third aspect of the invention is a plating system for plating a surface of an article, comprising a plating fluid tank for supporting a plating fluid reservoir; a plating apparatus for using plating fluid supplied from the plating fluid reservoir to plate the surface of the article; and a plating chemical replenishment system to periodically replenish the plating fluid reservoir during plating. The replenishment system a chemical solution tank for supporting a chemical solution used in the plating fluid; a container having a pre-determined volume; a first valve for selectively coupling the chemical solution from the chemical solution tank to the container to form a pre-determined volume of the chemical solution within the container; and a second valve for selectively dispensing the pre-determined volume of the chemical solution from the container to the plating fluid reservoir.

BRIEF DESCRIPTION OF THE DRAWINGS

FIG. 1 illustrates a block diagram of an exemplary plating system in accordance with the invention;

FIG. 2 illustrates a simplified block diagram of a portion of a chemical solution dispensing apparatus in accordance with the invention;

FIG. 3 illustrates a simplified block diagram of another chemical solution dispensing apparatus in accordance with the invention;

FIG. 4 illustrates a schematic diagram of an exemplary plating chemical replenishment system in accordance with the invention;

FIG. 5 illustrates a block diagram of a dispensing apparatus 500 that can be used for dispensing a pre-determined volume of plating chemical solutions or DI-water.

DESCRIPTION OF THE PREFERRED EMBODIMENTS

Figure 6A:
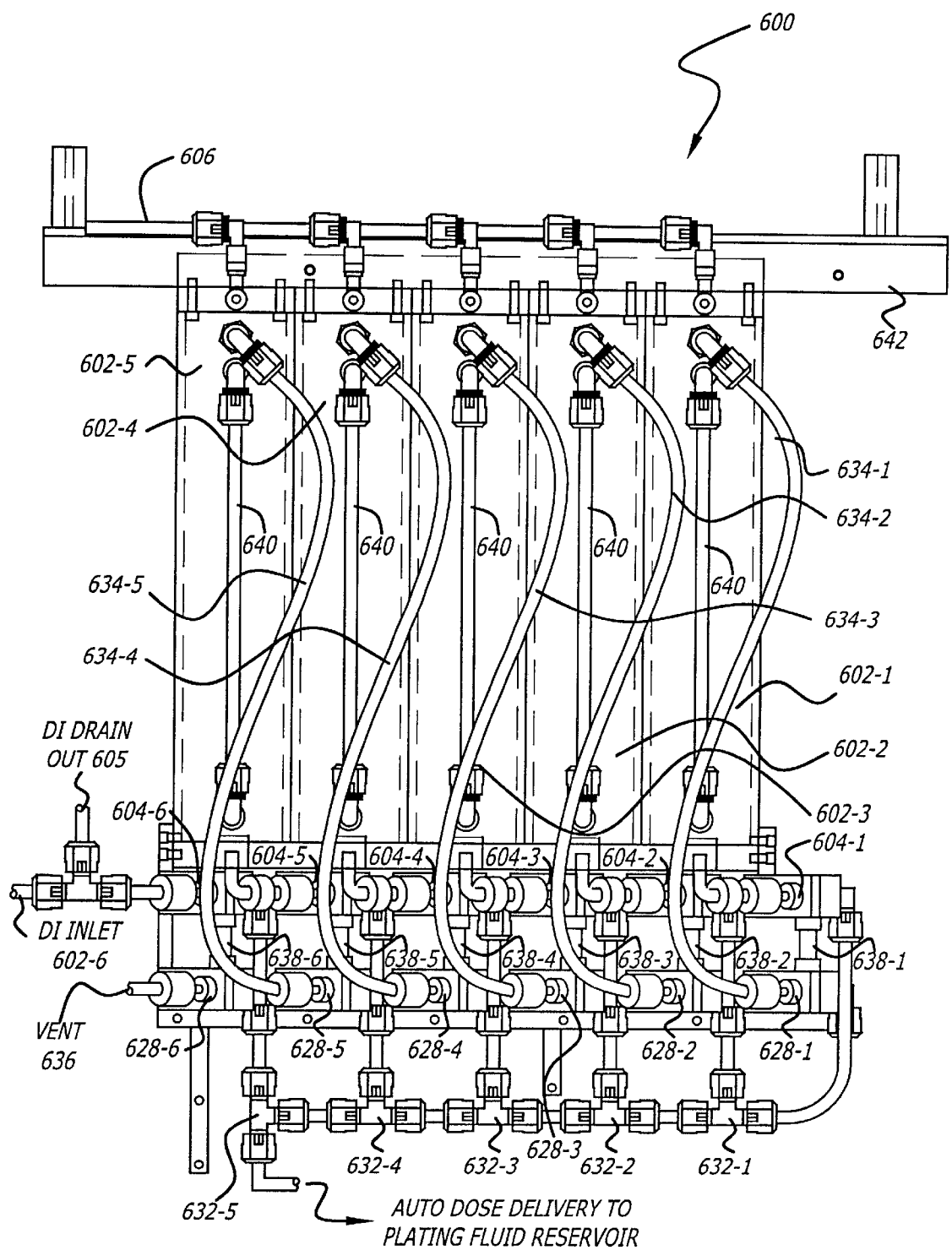
FIGS. 6A–6C are front, top and side views of a preferred embodiment of a plating chemical replenishment system in accordance with the invention.

I. Plating System with Plating Chemical Replenishment System

FIG. 1 illustrates a block diagram of an exemplary plating system 100 in accordance with the invention. The plating system 100 preferably comprises a plating fluid reservoir 102 for supplying fresh plating fluid to a plating apparatus 104. The plating apparatus 104 uses the fresh plating fluid to form a plating deposition across the surface of a wafer, substrate or article (not shown). The plating apparatus 104 may be of the types described in pending patent application Ser. No. 09/348,768, filed on Jul. 7, 1999, now U.S. Pat. No. 6,197,182, entitled "Improved Apparatus and Method For Plating Wafers, Substrates and Other Articles" and pending patent application Ser. No. 09/407,635, filed on Sep. 28, 1999, entitled "Anode Having Separately Excitable Sections to Compensate for Non-Uniform Plating Deposition Across the Surface of a Wafer Due to Seed Layer Resistance." These applications are incorporated herein by reference. After the fresh plating fluid is used by the plating apparatus 104, the used plating fluid is fed to a filter 106 to remove contaminants, and then recycled back to the plating fluid reservoir 102.

As it was previously discussed, the concentrations of the various chemicals in the plating fluid should be properly set and maintained to achieve the desired plating characteristic. However, the concentrations of these chemicals change over time due to dissipation, decomposition, and undesired chemical reactions. Thus, the plating fluid reservoir 102 should be periodically tested and replenished during plating to maintain the proper concentrations of the chemicals in the plating fluid so that the desired plating characteristics are achieved. In this respect, the plating system 100 comprises a chemical real time analyzer (RTA) 108 and a plating chemical replenishment system 110. The RTA 108 periodically measures the concentrations of the various chemicals in the plating fluid by way of a sense line. The RTA 108 then uses this measurement to determine the quantity of plating fluid to drain from the plating fluid reservoir 102 and the quantity of the various chemical solutions including de-ionized (DI) water to add to the plating fluid reservoir to maintain the desired concentrations for the various chemicals in the plating fluid.

The RTA 108 uses the information regarding the quantity of plating fluid to drain and chemicals to add to control, via a control line, the plating chemical replenishment system 110. The replenishment system 110, under the control of the RTA 108, precisely drains the plating fluid reservoir and precisely dispenses the quantities of the various chemicals including DI-water to the plating fluid reservoir 102 to achieve the desired concentrations of the chemicals in the plating fluid. For instance, the plating fluid may comprise five different chemical solutions labeled in FIG. 1 as Chm. Sol. 1–5 and DI-water. The replenishment system 110 independently controls the dispensing of Chm. Sol. 1–5 and DI-water. The dispensing of the chemicals (Chm. Sol. 1–5) including DI-Water and draining of the plating fluid reservoir should be controlled very precisely to achieve the desired concentrations of the chemicals (Chm. Sol. 1–5) in the plating fluid. The dispensing methodology of the invention achieves this precision dispensing of the chemicals and DI-water, and draining of the plating fluid reservoir 102.

II. Dispensing Methodology

FIG. 2 illustrates a simplified block diagram of a chemical solution dispensing apparatus 200 used to illustrate the dispensing methodology in accordance with the invention. The dispensing apparatus 200 may be used to dispense the chemical solutions (Chm. Sol. 1–5) or DI-Water separately as part of the replenishment system 110. The dispensing apparatus 200 comprises a tank 202 containing the chemical solution or DI-Water to be dispensed. The tank 202 includes an outlet that may be selectively coupled to a pre-determined volume 206 by way of a valve 204. The valve 204 receives a signal CNTL 1 that controls the opening and closing of the valve 204. The pre-determined volume 206 includes an outlet coupled to a second valve 208 for selectively dispensing the pre-determined volume 204 of the chemical solution to the plating fluid reservoir 102. The valve 208 receives a signal CNTL 2 that controls the opening and closing of the valve 204.

Prior to dispensing, the control signals CNTL 1–2 are set such that both valves 204 and 208 remain closed. To dispense a discrete pre-determined volume of chemical solution into the plating fluid reservoir 102, the control signal CNTL 1 is set to open valve 204 so that the chemical solution flows from tank 202 into pre-determined volume 206. Once the pre-determined volume 206 is filled with the chemical solution, the control signal CNTL 1 is set to close valve 204. Then, the control signal CNTL 2 is set to open valve 208 to allow the chemical solution in the pre-determined volume to flow to the plating fluid reservoir 102. Once the pre-determined volume is drained, the control signal CNTL 2 is set to close valve 208. This process is repeated a number of times as required by the RTA 108 so that the proper quantity of chemical solution is dispensed into the plating fluid reservoir 102. The pre-determined volume 206 should be sized to the desired incremental volume resolution.

The draining of the plating fluid reservoir 102 using this dispensing methodology is accomplished in a similar manner, except that in this case, the tank 202 is replaced with the plating fluid reservoir 102 and the output of valve 208 is fluidly coupled to a waste tank. In a similar fashion, control signal CNTL 1 is set to open valve 204 to allow plating fluid to drain from the plating fluid reservoir 102 into the pre-determined volume 206. Once the pre-determined volume 206 is filled, the control signal CNTL 1 is set to close valve 204. Then, the control signal CNTL 2 is set to open valve 208 so that the plating fluid in the pre-determined volume 206 flows to the waste tank. Once this occurs, control signal CNTL 2 is set to close valve 208, and the process is repeated until the desired amount of plating fluid is drained from the plating fluid reservoir 102. As in the dispensing case, the pre-determined volume 206 in the draining case should be sized at the desired decremental volume resolution.

FIG. 3 illustrates a simplified block diagram of another chemical solution dispensing apparatus 300 used to illustrate the dispensing methodology in accordance with the invention. As with dispensing apparatus 200, the dispensing apparatus 300 may be used to dispense the chemical solutions (Chm. Sol. 1–5) or DI-Water separately as part of the replenishment system 110. The dispensing apparatus 300 differs from dispensing apparatus 200 in that the former provides a technique to remove trapped gas in the pre-determined volume 306 when it is being filled. During filling of the pre-determined volume 306, air or other gases may sneak their way into the pre-determined volume 306. As a result, the amount of chemical solution in the pre-determined volume 306 may be less than the pre-determined volume due to the presence of trapped gases. Thus, there is a need to remove the trapped gas to insure that the volume of the chemical solution is substantially the same as the volume of the pre-determined volume 306.

In the preferred embodiment, the dispensing apparatus 300 comprises a tank 302 containing the chemical solution or DI-Water to be dispensed into the plating fluid reservoir 102. The tank 302 includes an outlet that may be selectively coupled to a pre-determined volume 306 by way of a valve 304. The valve 304 receives a signal CNTL 3 that controls the opening and closing of the valve 304. The pre-determined volume 304 includes an outlet coupled to a one-pole, two-throw valve 308. A control signal CNTL 4 is used to selectively couple the input of the valve 308 to either output. One of the outputs of valve 308 is fluidly coupled to the plating fluid reservoir 102 and the other output is fluidly coupled to a bleed line 310. The bleed line 310 gives the dispensing apparatus 300 the ability to remove trapped gas in the pre-determined volume 306 prior to dispensing the chemical solution from the pre-determined volume 306 into the plating fluid reservoir 102, as discussed in detail as follows.

Prior to dispensing, the control signal CNTL 3 is selected to set valve 304 in a closed position, and control signal CNTL 4 is selected to set valve 308 such that its input is coupled to the output connected to the bleed line 310. To dispense a discrete pre-determined volume of chemical solution into the plating fluid reservoir 102, the control signal CNTL 3 is set to open valve 304 so that the chemical solution flows from tank 302 into the pre-determined volume 306 and into the bleed line 310. After sufficient amount of chemical solutions is dispensed from the tank 302 to fill the pre-determined volume 306 and to at least partially fill the bleed line 310, the control signal CNTL 3 is set to close valve 304.

The end of the bleed line is preferably positioned above the pre-determined volume 306 so that substantially all the trapped gas within the pre-determined volume 306 flows due to buoyancy into the bleed line 310. After a sufficient time to allow substantially all the gas to leave the pre-determined volume 306, the control signal CNTL 4 is set to fluidly couple the input of valve 308 to the output that is coupled to the plating fluid reservoir 102, thereby dispensing the pre-determined volume of chemical solution into the plating fluid reservoir 102. This process is repeated a number of times as required by the RTA 108 so that the proper quantity of chemical solution is dispensed into the plating fluid reservoir 102. The pre-determined volume 306 should be sized at the desired incremental volume resolution.

The draining of the plating fluid reservoir 102 using this dispensing methodology is accomplished in a similar manner, except that in this case, the tank 302 is replaced with the plating fluid reservoir 102 and one of the outputs of valve 308 is fluidly coupled to a waste tank. In a similar fashion, control signal CNTL 3 is set to open valve 304 to allow plating fluid to drain from the plating fluid reservoir 102 into the pre-determined volume 306 and the bleed line 310. Once the pre-determined volume 306 is filled and the bleed line 310 is at least partially filled, the control signal CNTL 3 is set to close valve 304. After a sufficient time to allow substantially all the gas to leave the pre-determined volume 306, the control signal CNTL 4 is set to fluidly connect the input of valve 308 to the output that is coupled to the waste tank, thereby draining the pre-determined volume of plating fluid from the plating fluid reservoir 102. This process is repeated a number of times as required by the RTA 108 so that the proper quantity of chemical solution is drained from the plating fluid reservoir 102. The pre-determined volume 306 should be sized at the desired decremental volume resolution.

III. The Preferred Embodiment of the Plating Chemical Replenishment System

A. Preferred Elements of the Plating Chemical Replenishment System

FIG. 4 illustrates a schematic diagram of an exemplary plating chemical replenishment system 400 in accordance with the invention. The replenishment system 400 comprises at least one tank for each chemical solution required for the plating fluid. In this case, for example, the replenishment system 400 includes five chemical solution tanks 402-1 through 402-5. The replenishment system 400 also includes an inlet 402-6 for DI-water as required by the plating fluid mixture. The outputs of the chemical solution tanks 402-1 through 402-5 are fluidly coupled to respective normally-closed (N.C.) inputs of one-pole, two-throw pneumatic valves 404-1 through 404-5. The DI-water inlet 402-6 is fluidly coupled to one-a normally-closed (N.C.) input of one-pole, two-throw pneumatic valve 404-6 by way of T-fitting 403, which has a port fluidly coupled to a DI-water drain 405. The chemical solutions tanks 402-1 through 402-5 are fluidly coupled to vent/clean line 406 by way T-fittings 408-1 through 408-4. The vent/clean line 406 is fluidly coupled to an output port (C) of one-pole, two-throw pneumatic valve 410. The valve 410 has a normally-open (N.O.) input fluidly coupled to a vent 412, and a normally-closed (N.C.) input fluidly coupled to a compressed dry air (CDA)/DI-water select inlet 414 by way of T-fitting 416.

The valves 404-1 through 404-6 respectively have normally-open (N.O.) inputs fluidly coupled to a low pressure CDA/clean line 418 by way of T-fittings 420-1 through 420-5. The CDA/clean line 418 is fluidly coupled to an output port (C) of one-pole, two-throw pneumatic valve 422. The valve 422 has a normally-closed input (N.C.) fluidly coupled to T-fitting 416, and a normally-open (N.O.) input fluidly coupled to an output port of valve 424. The valve 424 has an input fluidly coupled to a low pressure CDA source 426. The valves 404-1 through 404-6 also respectively have output ports (C) fluidly coupled to respective inputs (C) of one-pole, two-throw pneumatic valves 428-1 through 428-6. The valves 428-1 through 428-6 respectively have normally-closed (N.C.) outputs fluidly coupled to autodose line 430 by way of T-fittings 432-1 through 432-5. The autodose line 430 is selectively coupled to either the plating fluid reservoir or a waste tank. The valves 428-1 through 428-5 also respectively have normally-open (N.O.) outputs fluidly coupled to respective bleed lines 434-1 through 434-5. The bleed lines 434-1 through 434-5, in turn, are fluidly coupled back to respective chemical solution tanks 402-1 through 402-5. Valve 428-6 has a normally-open (N.O.) output coupled to vent line 436.

The pre-determined volumes 438-1 through 438-5 for the respective chemical solutions 1–5 and DI-water is the piping that fluidly couples the respective (C) ports of valves 404-1 through 404-6 and valves 428-1 through 428-6, respectively, plus some displacement in the respective valves. The piping is selected so that the pre-determined volume is sized at the desired incremental volume resolution. The piping can be changed to different size pipings to alter the desire incremental volume resolution.

B. Preferred Dispensing Method of the Plating Chemical Replenishment System

The description of the preferred dispensing method of the plating chemical replenishment system 400 is discussed as follows. The dispensing of chemical solution no. 2 will be used to exemplify the invention. The dispensing of the other chemical solutions and DI-water operate in the same manner. Prior to dispensing, the valves 404, 410, 422, and 428 are set to their respective normally-open (N.O.) positions. Valve 424 is initially set closed. The first step in the dispensing operation is to position valves 404-2 in their normally-closed (N.C.) position. This step allows chemical solution in tank 402-2 to flow through valve 404-2 and fill the pre-determined volume 438-2 and at least partially fill the bleed line 434-2 by way of valve 428-2. Preferably, the chemical solution flows under hydrostatic pressure. During this operation, the valve 410 is set to its normally-open (N.O.) position to fluidly couple the tank vent 412 to the tank 402-2 so that the chemical solution is allowed to freely flow under hydrostatic pressure. The bleed line 434-2 provides an outlet for gas (e.g. air) that is present in the pre-determined volume 438-2.

The next step in the preferred dispensing method of the plating chemical replenishment system 400 is to position valve 404-2 into its normally-open (N.O.) position to remove the fluid coupling between the chemical solution tank 402-2 and the pre-determined volume 438-2. Then, valve 428-2 is set to its normally-closed (N.C.) position to fluidly couple the pre-determined volume 438-2 to the plating fluid reservoir by way of the autodose line 430. Then, valve 424 is opened to apply low pressure CDA 426 to the normally-open (N.O.) port of valve 404-2 so that the chemical solution in the pre-determined volume 438-2 is forced out of the pre-determined volume 438-2 and dispensed to the plating fluid reservoir. After this occurs, valve 428-2 is set to its normally-open (N.O.) position so that the low pressure CDA 426 pushes the remaining chemical solution in the bleed line 434-2 back into the chemical solution tank 402-2. After this step, valve 424 is closed, and the process is repeated again for dispensing another discrete pre-determined volume of chemical solution into the plating fluid reservoir.

This process is repeated a number of times as required by the RTA so that the desired quantity of the chemical solution is dispensed into the plating fluid reservoir. The process of providing the desired quantity of chemical solutions to the plating fluid reservoir through a series of dispensing procedure is defined herein as a dispensing interval. The RTA measures the concentrations of the chemicals in the plating fluid, for example, once a few minutes. It then instructs the replenishment system 400 to dispense a certain amount of quantity of at least one chemical or D.I. water. Then, the replenishment system 400 undergoes a dispensing interval to provide the desired quantity of at least one chemical solution or D.I. water by dispensing a series of pre-determined volumes of chemical solution as described above. After this occurs, the RTA takes another measurement of the concentrations of the chemicals in the plating fluid, and the dispensing interval process is undertaken again. This process of measuring and replenishing the plating fluid continues until the plating process is complete.

C. Preferred Cleaning Method of the Plating Chemical Replenishment System Between Dispensing Intervals As previously discussed, the plating process may require the RTA to periodically take several measurements of the concentrations of the chemicals in the plating fluid, and periodically cause the replenishment system 400 to undergo a dispensing interval so that the desired chemical concentrations for the plating fluid is maintained. In between dispensing intervals, it may be desirable to clean the pre-determined volumes 438-1 through 438-6 to remove any chemical solution residue. To begin the cleaning process after completion of a dispensing interval, the valves 404-1 through 404-6 are set to their respective normally-open (N.O.) positions, and valves 428-1 through 428-6 are set to their respective normally-closed (N.C.) positions. The auto-dose delivery line 430 is then selectively coupled to a waste tank. Then, valve 422 is set to its normally-closed (N.C.) position and CDA/DI-water 414 is set to provide DI-water to substantially flush the pre-determined volumes 438-1 through 438-6 with DI-water and remove any chemical residue therein. The used DI-Water drains into a waste tank (not shown) by way of the autodose delivery line 430. After the control volumes 438-1 through 438-6 are properly flushed, the CDA/DI-Water select 414 is set to deliver CDA to substantially dry the pre-determined volumes 438-1 through 438-6. After this cleaning process is complete, the valves are set to their normally-open positions (N.O.).

D. Preferred Cleaning Method of the Plating Chemical Replenishment System After Completion of Plating Cycle After completion of a plating cycle, it may be desirable to clean the chemical solutions tanks, the pre-determined volumes, and all other conduits that are exposed to the chemical solutions. To perform this cleaning operation, all the valves (i.e. valves 404-series, 410, 422, and 428-series) are set to their respective normally-closed (N.C.) positions. This step fluidly couples the CDA/DI-Water select 414 to the chemical solution tanks 402-1 through 402-5, the pre-determined volumes 438-1 through 438-5, the valves 404-1 through 404-5, the valves 428-1 through 428-5, and auto-dose delivery line 430 so that rinsing of these elements occurs. During this cleaning process, the valves 428-1 through 428-5 may be set to their respective normally-open (N.O.) positions to direct DI-water into and flush the bleed lines 434-1 through 434-5. After the rinsing cycle, the CDA/DI-water select 414 is set to deliver CDA to substantially dry the elements of the replenishment system 400 previously rinsed.

E. Alternative Embodiment for the Dispensing Apparatus

FIG. 5 illustrates a block diagram of a dispensing apparatus 500 that can be used in place of the dispensing valve arrangement depicted in FIG. 4. The dispensing apparatus 500 preferably comprises an input check valve 502, an output check valve 506, and a pre-determined volume 504 interposed between the check valves 502 and 506. The check valves 502 and 506 allow fluid to flow in one direction (as indicated by the arrows in FIG. 5), and prevent fluid flow in the opposite direction. In a dispensing application, the input check valve 502 is fluidly coupled to the corresponding chemical solution tank or D.I. water inlet, and the output check valve 506 is fluidly coupled to the plating fluid reservoir. In a draining application, the input check valve is fluidly coupled to the plating fluid reservoir, and the output check valve 506 is fluidly coupled to a waste tank. The dispensing apparatus 500 further includes an occluding mechanism such as plunger 508 situated within the pre-determined volume 504 and a driver 510 that controls the lateral movement of the plunger 508. The driver 510 may comprise a pneumatic driver, a solenoid driver, an electric motor or a rotating cam.

Prior to a dispensing or draining action, the plunger 508 is positioned within the pre-determined volume 504 to prevent fluid flow from the input check valve 502 into the pre-determined volume 504. During a dispensing or draining action, the driver 510 is actuated to cause the plunger 508 to move laterally away from the pre-determined volume, and allow fluid flow from the input check valve 502 into the pre-determined volume 504. After the pre-determined volume 504 is filled, the driver 510 is actuated to cause the plunger 508 to move laterally into the pre-determined volume 504 and push the fluid into and through the output check valve 506. The input check valve 502 prevents the fluid to flow from the pre-determined volume 504 into the input check valve 502.

Figure 6B:
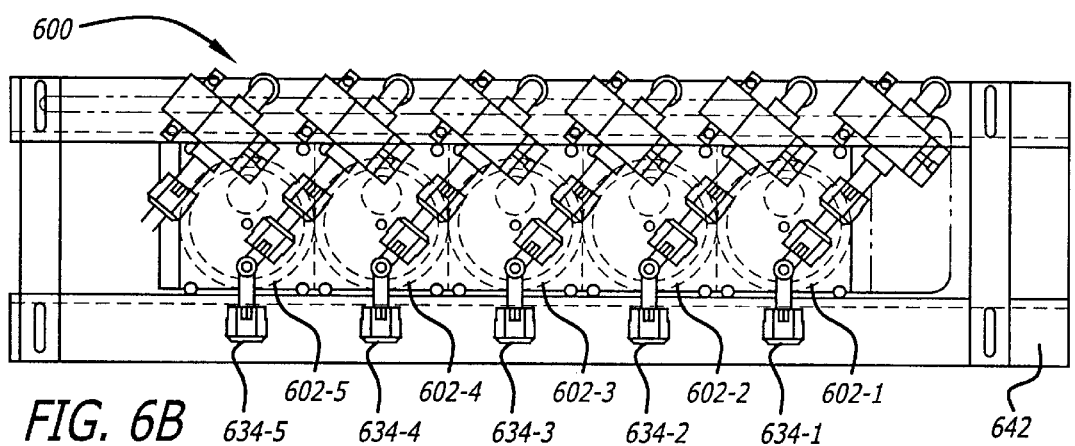
Figure 6C:
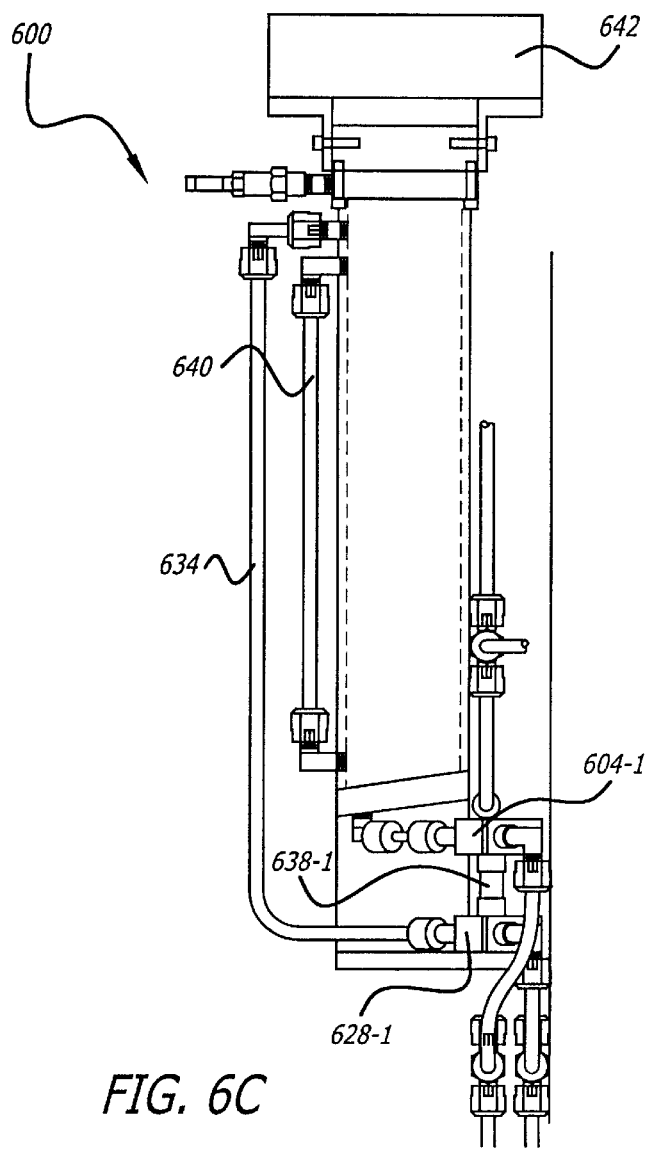

IV. The Preferred Physical Embodiment of the Plating Chemical Replenishment System FIGS. 6A–6C are front, top and side views of a preferred physical embodiment of a plating chemical replenishment system 600 in accordance with the invention. The plating chemical replenishment system 600 is the physical implementation of the schematically represented replenishment system 400 of FIG. 4. The reference numbers for elements in FIG. 6 are the same reference numbers for corresponding elements in FIG. 4, except that the most significant digit is a "6" instead of a "4." Thus, the detailed discussions of the elements should be referred to the section of the specification that describes replenishment system 400. It should be noted that the chemical solution tanks 602-1 through 602-5 are elongated vertically, and are securely positioned adjacent to each other by a mainframe 642. The chemical solution tanks 602-1 through 602-5 have respective external fluid level indicators 640-1 through 640-6. The pre-determined volumes 638-1 through 638-6 are configured as relatively short pipes that provide a pre-determined volume displacement. As previously discussed, the pre-determined volumes 638-1 through 638-6 also include some displacements introduced by the valves on either side of the pipes. In order to change the pre-determined volumes 638-1 through 638-6, the pipes may be changed to provide a different volume displacement.

CONCLUSION

While the invention has been described in connection with various embodiments, it will be understood that the invention is capable of further modifications. This application is intended to cover any variations, uses or adaptation of the invention following, in general, the principles of the invention, and including such departures from the present disclosure as come within known and customary practice within the art to which the invention pertains.

It is claimed:

1. A plating system for plating a surface of an article, comprising:

a plating fluid tank for supporting a plating fluid reservoir;

a plating apparatus for using plating fluid from said plating fluid reservoir to plate the surface of said article; and a plating chemical replenishment system, comprising:

a plurality of chemical solution tanks for respectively supporting a plurality of different chemical solutions used in a plating fluid;

a plurality of containers respectively having pre-determined volumes;

a plurality of first valves for selectively coupling individually said different chemical solutions from respective chemical solution tanks to said respective containers to form respective pre-determined volumes of said chemical solutions within respective containers;

a plurality of second valves for selectively dispensing individually said pre-determined volumes of said different chemical solutions from respective containers to said plating fluid reservoir; and a chemical real time analyzer for measuring respective concentrations of said different chemical solutions in said plating fluid in said plating fluid reservoir, and for causing said plating chemical replenishment system to dispense respective amounts of said pre-determined volumes of said different chemical solutions to said plating fluid reservoir.

2. The plating system of claim 1, further including a filter for removing contaminants from used plating fluid draining from said plating apparatus.

3. The plating system of claim 2, wherein said filtered plating fluid is recycled back to said plating fluid reservoir.

4. The plating system of claim 1, wherein at least one of said containers includes a pipe connecting said respective first and second valves.

5. The plating system of claim 1, further comprising at least one bleed line fluid coupled to respective container for removing gas from said container.

6. The plating system of claim 1, wherein at least one of said second valves includes an inlet fluidly coupled to said respective container, a first outlet for dispensing said pre-determined volume of said respective chemical solution to said plating fluid reservoir, and a second outlet fluidly coupled to a bleed line, and further wherein said inlet is fluidly coupled to said second outlet during the forming of said pre-determined volume of said respective chemical solution to allow gas to flow out of said container and into said bleed line, and said inlet is fluidly coupled to said first outlet during the dispensing of said pre-determined volume of said respective chemical solution to said plating fluid reservoir.

7. The plating system of claim 1, wherein at least one of said first valves includes a first inlet fluidly coupled to said respective chemical solution tank, a second inlet for receiving a pressurized gas, and an outlet fluidly coupled to said respective container, and further wherein said first inlet is fluidly coupled to said outlet during the forming of said pre-determined volume of said respective chemical solution within said respective container, and said second inlet is fluidly coupled to said outlet to allow the pressurized gas to force said pre-determined volume of chemical solution out of said container during the dispensing of said pre-determined volume of chemical solution to said plating fluid reservoir.

8. The plating system of claim 1, wherein at least one of said first valves includes a first inlet fluidly coupled to said respective chemical solution tank, a second inlet for receiving a pressurized gas, and a first outlet fluidly coupled to said respective container, and further wherein at least one of said second valves includes a third inlet fluidly coupled to said respective container, a second outlet for dispensing said pre-determined volume of said respective chemical solution to said plating fluid reservoir, and a third outlet fluidly coupled to a bleed line, wherein said first inlet is fluidly coupled to said first outlet during the forming of said pre-determined volume of said respective chemical solution, and said second inlet is fluidly coupled to said first outlet to allow the pressurized gas to force said pre-determined volume of said respective chemical solution out of said respective container during the dispensing of said pre-determined volume of said respective chemical solution to said plating fluid reservoir, and further wherein said third inlet is fluidly coupled to said third outlet during the forming of said pre-determined volume of said respective chemical solution to allow gas to flow out of said respective container and into said bleed line, and said third inlet is fluidly coupled to said second outlet during dispensing of said pre-determined volume of said respective chemical solution to said plating fluid reservoir.

* * * * *